United States Patent
Burns et al.

(10) Patent No.: US 6,875,494 B2
(45) Date of Patent: Apr. 5, 2005

(54) FLUID ABSORBING APPARATUS

(75) Inventors: William G. Burns, Grosse Pointe Park, MI (US); William G. Lianos, Grosse Pointe, MI (US); Roger Zeller, Smith Creek, MI (US); Robert J. Thiele, Port Huron, MI (US)

(73) Assignees: Consolidated Industrial Corporation, Chesterfield, MI (US); Emerging Markets Incorporated, Grosse Pointe, MI (US)

( * ) Notice: Subject to any disclaimer, the term of this patent is extended or adjusted under 35 U.S.C. 154(b) by 12 days.

(21) Appl. No.: 10/325,587

(22) Filed: Dec. 19, 2002

(65) Prior Publication Data

US 2004/0121112 A1 Jun. 24, 2004

(51) Int. Cl.[7] ................................................ B32B 3/10
(52) U.S. Cl. ........................ 428/138; 428/192; 4/251.1
(58) Field of Search ................... 428/68, 138, 192; 15/215; 4/251.1

(56) References Cited

U.S. PATENT DOCUMENTS

| | | |
|---|---|---|
| 4,285,075 A | 8/1981 | Nelson |
| 4,328,275 A | 5/1982 | Vargo |
| 4,439,474 A | 3/1984 | Sagel |
| 4,484,661 A | 11/1984 | Evenson |
| 4,497,147 A | 2/1985 | Clapper et al. |
| 4,609,580 A | 9/1986 | Rockett et al. |
| 4,798,754 A | 1/1989 | Tomek |
| 4,822,669 A | 4/1989 | Roga |
| 4,826,030 A | 5/1989 | Valley |
| 5,028,468 A | 7/1991 | Taylor |
| 5,080,956 A | 1/1992 | Smith |
| 5,114,774 A | 5/1992 | Maxim, Jr. |
| 5,128,189 A | 7/1992 | Bartlett |
| 5,270,089 A | 12/1993 | Alston et al. |
| 5,383,570 A | 1/1995 | Gordon |
| 5,506,040 A | 4/1996 | Cordani |
| 5,549,945 A | 8/1996 | Lind |
| 5,613,332 A | 3/1997 | Saylor, Jr. |
| 5,916,658 A | 6/1999 | Mohr |
| 6,446,275 B1 | 9/2002 | Wright et al. |

*Primary Examiner*—Alexander S. Thomas
(74) *Attorney, Agent, or Firm*—Brooks Kushman P.C.

(57) ABSTRACT

A fluid absorbing apparatus. The fluid absorbing apparatus includes an absorbing layer having a fluid absorbing material and a protective layer having a number of apertures extending through the protective layer and in fluid communication with the absorbing layer.

14 Claims, 2 Drawing Sheets

FLUID ABSORBING APPARATUS

BACKGROUND OF THE INVENTION

1. Field of the Invention

The present invention relates to a fluid absorbing apparatus.

2. Background Art

A fluid absorbing apparatus can be used to absorb and retain a fluid from spreading to the surrounding area. Such a fluid absorbing apparatus can be used in a number of environments, like a restroom, for absorbing fluid that may leak or spill from a urinal or a commode.

SUMMARY OF THE INVENTION

The present invention relates to a fluid absorbing apparatus. The apparatus includes a protective layer adhered to a fluid absorbing layer. The protective layer includes a number of tapered apertures extending through the protective layer and in fluid communication with the absorbing layer. The underside of the protective layer is adhered to the absorbing layer and includes a number of tapered grooves around each aperture.

DETAILED DESCRIPTION OF THE PREFERRED EMBODIMENT(S)

Figure 1:
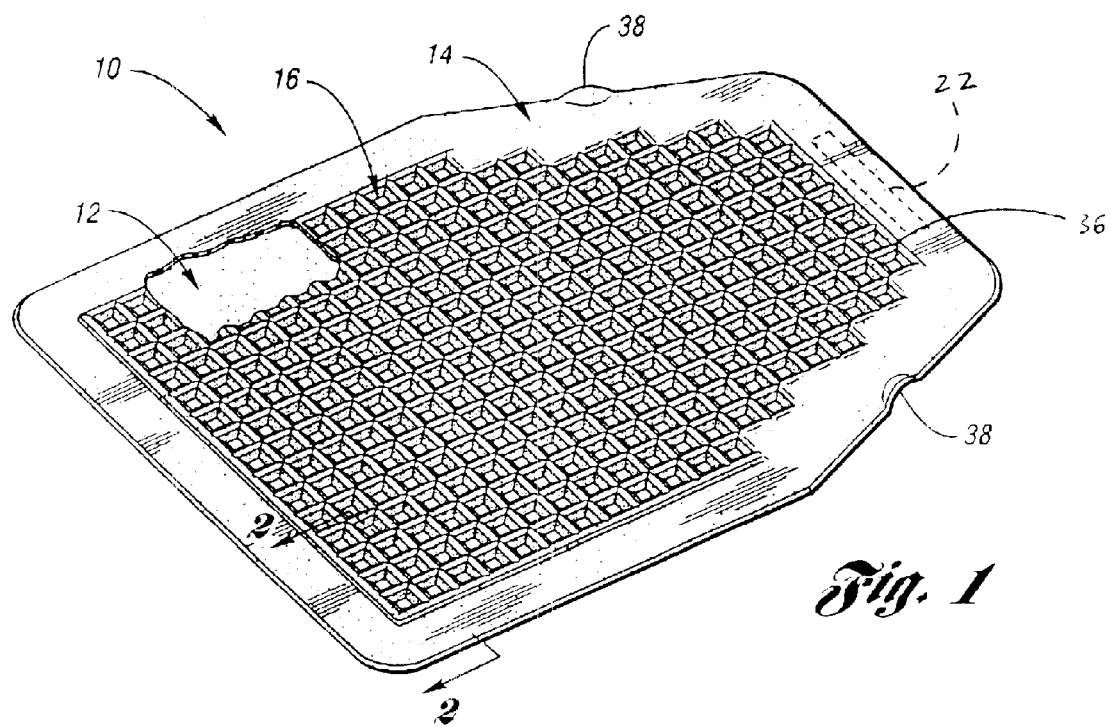
FIG. 1 illustrates a perspective view of a fluid absorbing apparatus, in accordance with the present invention.

FIG. 1 illustrates a perspective view of a fluid absorbing apparatus in accordance with one aspect of the present invention. The fluid absorbing apparatus 10 can be used for absorbing and retaining a fluid from spreading to the surrounding area. In particular, the fluid absorbing apparatus 10 shown is shaped for placement below a urinal, but the fluid absorbing apparatus 10 can also be shaped to fit around a commode, or it can be shaped for and used in any other configuration or environment.

The fluid absorbing apparatus 10 includes an absorbing layer 12 and a protective layer 14. The absorbing layer 12 adheres, as shown through the cut-away section, to the underside of the protective layer 14. The absorbing layer 12 can comprise a fluid absorbing material and the protective layer 14 can be an injected molded plastic so that, together, the absorbing layer 12 and the protective layer 14 comprise a disposable floor mat product that can be easily removed and replaced below a urinal or around a commode for absorbing fluid. If the absorbing layer 12 becomes saturated or begins to smell, the absorbing apparatus 10 can be simply thrown away and replaced.

Figure 2:
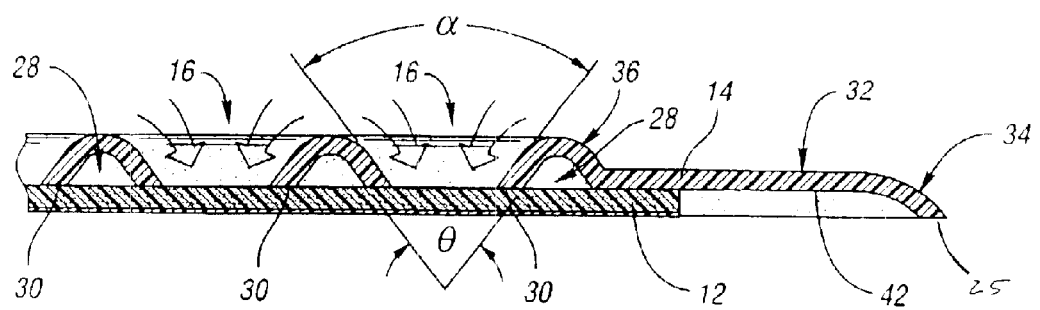
FIG. 2 illustrates a fragmentary cross-sectional view of the fluid absorbing apparatus, in accordance with the present invention.

FIG. 2 illustrates a fragmentary cross-sectional view of a portion of the fluid absorbing apparatus 10. In operation, the fluid that spills or leaks from the urinal is directed by a number of apertures 16 in the protective layer 14 for passage to the absorbing layer 12. The apertures 16 are tapered and extend through the protective layer 14 so that the fluid can be absorbed by the absorbing layer 12. The large arrows illustrate the passage of the fluid through the apertures 16 for absorption by the fluid absorbing layer 12.

The fluid absorbing layer 12 can adhere to a moisture barrier layer 24. The fluid absorbing layer 12 can be any fluid absorbing material like a non-woven fiber or a thermal bonded web consisting of fluff pulp, bonding fiber, and super-absorbent fiber. The moisture barrier layer 24 can be any waterproof material, like a closed-cell foam. The moisture barrier layer 24 prevents substantially any fluid that enters through the apertures 16 from leaking through the bottom of the moisture barrier layer 24 to contaminate or stain the floor. The moisture barrier layer 24 can be a material having a low coefficient of friction for use in preventing movement of the fluid absorbing apparatus 10 relative to the surface on which it is placed, such as the floor beneath the urinal. Instead of, or in combination with, the low coefficient of friction material, the protective layer can include a piece of velcro 22. The velcro 22 is secured to the underside of the protective layer 14 for securement with a mating piece of velcro attached to the floor. The velcro 22 can be used to further limit slipping and for providing a common floor location that can be used for repeatedly locating the mat in a desired position. While not shown, the moisture barrier layer 24 can wrap around the ends of the fluid absorbing layer 12 or extend laterally to a bottom edge 25 of the protective layer 14 for adhering to the protective layer 14 to prevent any absorbed fluid from leaking out the sides of the absorbing layer 12. Alternatively, the moisture barrier layer 24 may be unnecessary if a moisture barrier substance is sprayed or rolled over the moisture barrier layer 12 to adhere and seal the moisture barrier layer 12 to the protective layer 14.

The protective layer 14 includes a number of tapered grooves 28 around each tapered aperture 16 that, in cooperation with the downwardly opening tapered apertures, help direct forces in a lateral direction when the apparatus 10 is stepped on. The ability to direct the forces in a lateral direction is proportional to a groove tapered angle $\theta$ and an aperture tapered angle $\alpha$. When the groove angle $\theta$ equals the aperture angle $\alpha$, the tapered apertures 16 are characterized as parallelly matching the tapered grooves 28. As shown, the tapered apertures 16 parallelly match the tapered grooves 18, but the angles do not have to match.

Figure 3:
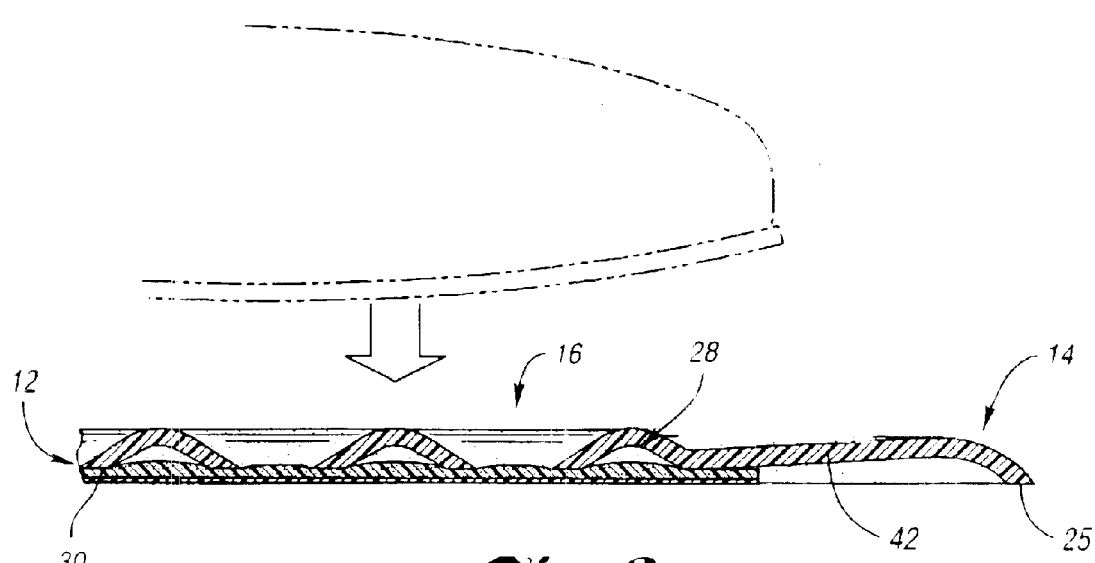
FIG. 3 illustrates a result of applying a downward force to the fluid absorbing apparatus, in accordance with the present invention.

FIG. 3 illustrates the result of applying force, typically that of a person standing on top of the fluid absorbing apparatus 10, to the fluid absorbing apparatus 10. As described above, the tapered apertures 16 and the tapered grooves 28 bend to cause the force to exert against the absorbing layer 12 in a substantially lateral direction, as opposed to only a perpendicular direction. As the moisture barrier layer 24 prevents fluid that passes through the apertures 16 from seeping onto the floor, the angles should be selected so that when a downward force is supplied, there is a resultant lateral force which spreads the loading and prevents puncturing of the moisture barrier layer 24. Depending on the type of material comprising the protective layer 14, the taper for the grooves 28 and the apertures 16 may need to be adjusted accordingly. For example, a relatively flexible plastic will require less of a taper than a relatively stiff plastic, as the relatively flexible plastic tends to bend more easily. The bending action of the protective layer 14 causes the fluid absorbing layer 12 to compress and, depending on the type of fluid absorbing material comprising the fluid absorbing layer 12, the release of the compression can create a vacuum or a wicking action that causes absorbed fluid to flow into the area under the grooves 28. Such action can be useful in absorbing more fluid and for preventing the fluid from dripping from the apparatus 10 when turned upside down.

In addition to laterally directing the force, the tapered grooves 28 and the tapered apertures 16 define aperture faces 30 around the apertures 16. The aperture faces 30 have a surface area that is proportional to the tapered angles θ and α and a thickness of the protective layer 14. The angles θ and α can be adjusted to increase or decrease the surface area of the faces 30. For example, it may be desirable to increase the surface area of the faces 30 so that the faces 30 have a larger area in contact with the absorbing layer 12. The larger surface area provides more area to apply glue for adhering the absorbing layer 12 to the protective layer 14 and the larger surface area helps blunt the faces 30 so that less of an edge or point contacts the absorbing layer 12.

As shown in FIG. 1, the apparatus 10 can include portions that do not include the apertures 16. One of these portions is an outer rim portion 32. The outer rim portion 32 can include a bevel edge portion 34 overlaying the thickness of the absorbing layer 12 to help hide the absorbing layer 12 and to help prevent tripping. Moreover, the protective layer 14 can include an upper wall portion 36 surrounding the apertures 16 and extending upwardly from the outer rim portion 32. The upper wall portion 36 can be sufficiently rounded for preventing fluid from becoming stationary on the upper wall portion. This helps to ensure all fluid is directed to the absorbing layer 12. In addition, the outer rim portion 28 can include a finger relief 38 for assisting with picking up the absorber 10.

Figure 4:
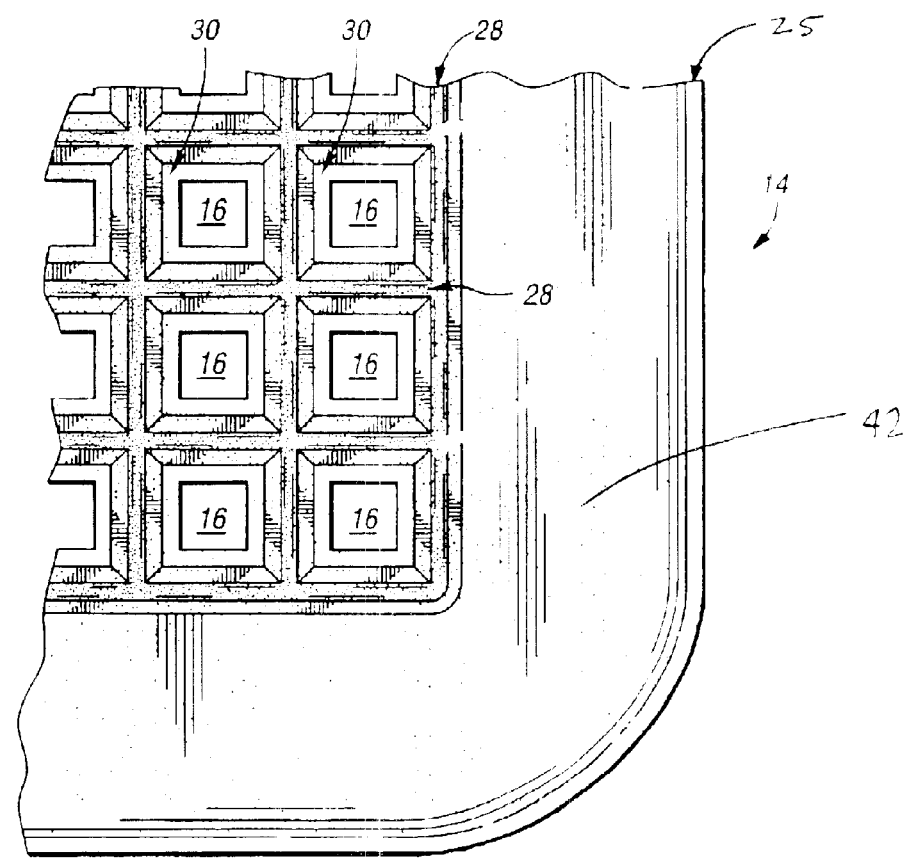
FIG. 4 illustrates an underside portion of a protective layer of the fluid absorbing apparatus before attachment to the absorbing layer, in accordance with the present invention.

The protective layer 14 is flipped over and the absorbing layer 12 is removed to reveal a portion of the underside in FIG. 4. The differential shading is used to illustrate the bottom edge 25, the tapered grooves 28, the aperture faces 30, and the underside portion 42 with more detail. The grooves 28 appear with a dotted configuration to show a difference in elevation from the aperture faces 30 and the underside portion 42. The grooves 28 also appear in a generally orthogonal arrangement, but such an arrangement is not required. Other shapes for the apertures 16, like an oval or triangle, could be used with grooves 28 shaped to correspond with the oval or triangular apertures 16. The aperture faces 30 and the underside surface 42 have a light shading to show a common elevation illustrating that these two portions can be substantially coplanar for ensuring the absorbing layer 12 lies substantially flat against the underside of the protective layer 14. Glue, or other adhesive, can be sprayed or rolled onto the coplanar surfaces for adhering the absorbing layer 12 to the protective layer 14. The absorbing layer 12, since the adhering surfaces are coplanar, should require minimal, if any, pressure to adhere the protective layer 14 while the glue cures. The non-shaded portion illustrates the different elevation for the bottom edge 25 of the bevel edge 34.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A fluid absorbing apparatus, the apparatus comprising:
   an absorbing layer comprising a fluid absorbing material;
   a protective layer having an underside adhered to the absorbing layer and a number of tapered apertures extending through the protective layer and in fluid communication with the absorbing layer, wherein the underside includes tapered grooves around each aperture configured to define an aperture face around each aperture; and
   an adhering material applied to the aperture faces for adhering the absorbing layer thereto.

2. The apparatus of claim 1 wherein the tapered apertures parallelly match the tapered grooves.

3. The apparatus of claim 1 wherein the absorbing layer includes a moisture barrier layer adhered to an underside of the absorbing layer.

4. The apparatus of claim 3 wherein the moisture barrier layer adheres to the protective layer for preventing absorbed fluid from leaking out a side of the absorbing layer.

5. The apparatus of claim 3 wherein the aperture face has a surface area proportional to the tapered apertures and the tapered grooves.

6. The apparatus of claim 5 wherein the apertures and grooves are sufficiently tapered to prevent the aperture face from puncturing through the moisture barrier when a person steps on the protective layer.

7. The apparatus of claim 6 wherein the apertures and grooves are sufficiently tapered to compress against the absorbing layer and to uncompress to cause absorbed fluid to flow into an area between the absorbing layer and the grooves.

8. The apparatus of claim 7 wherein the moisture barrier layer comprises a waterproof material having a low coefficient of friction for use in preventing movement of the fluid absorbing apparatus.

9. The apparatus of claim 8 wherein the protective layer includes an outer rim portion and having a bevel edge overlaying a thickness of the absorbing layer.

10. The apparatus of claim 9 wherein the outer rim includes at least one finger relief for assistance in picking up the fluid absorbing apparatus.

11. The apparatus of claim 10 wherein glue adheres the absorbing layer with the protective layer to form a disposable fluid absorbing apparatus.

12. The apparatus of claim 11 wherein the aperture faces are substantially coplanar with the underside of the outer rim portion so that the absorbing layer lies substantially flat against the aperture faces and the outer rim portion for use in gluing the absorbing layer to the protective layer.

13. The apparatus of claim 12 wherein the protective layer includes an upper wall portion surrounding the apertures, the upper wall portion being sufficiently rounded for preventing fluid from becoming stationary on the upper wall portion.

14. A fluid absorbing apparatus, the apparatus comprising:
   an absorbing layer comprising a fluid absorbing material; and
   a protective layer having an underside adhered to the absorbing layer and a number of tapered apertures extending through the protective layer and in fluid communication with the absorbing layer, wherein the underside includes tapered grooves around each aperture configured to define an aperture face around each aperture;
   wherein the apertures and grooves are sufficiently tapered to prevent the aperture face from puncturing through the moisture barrier when a person steps on the protective layer; and
   an adhering material applied to the aperture faces for adhering the absorbing layer thereto.

* * * * *